(12) United States Patent
Pearson et al.

(10) Patent No.: US 10,794,726 B2
(45) Date of Patent: Oct. 6, 2020

(54) COMPUTING AND DISPLAYING CLIMB DIVE MARKER ELEVATION

(71) Applicant: ELBIT SYSTEMS OF AMERICA, LLC, Fort Worth, TX (US)

(72) Inventors: John Timothy Pearson, Fort Worth, TX (US); Lawerance Ray Butler, Aledo, TX (US); Keith Thomas Grandin, Weatherford, TX (US); Michael Allen Robb, Bedford, TX (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 197 days.

(21) Appl. No.: 15/883,989

(22) Filed: Jan. 30, 2018

(65) Prior Publication Data

US 2019/0025077 A1 Jan. 24, 2019

Related U.S. Application Data

(60) Provisional application No. 62/535,809, filed on Jul. 21, 2017.

(51) Int. Cl.
*G05D 1/00* (2006.01)
*G01C 23/00* (2006.01)
(Continued)

(52) U.S. Cl.
CPC .......... *G01C 23/005* (2013.01); *B64D 43/00* (2013.01); *G02B 27/0101* (2013.01); *G02B 2027/0141* (2013.01)

(58) Field of Classification Search
CPC ... G01C 23/005; B64D 43/00; G02B 27/0101
See application file for complete search history.

(56) References Cited

U.S. PATENT DOCUMENTS

| 4,368,517 A | 1/1983 | Lovering |
| 5,212,480 A | 5/1993 | Ferro |
| (Continued) | | |

FOREIGN PATENT DOCUMENTS

WO 99/03000 1/1999

OTHER PUBLICATIONS

Preliminary Report on Patentability for related International Application No. PCT/US2018/043155; report dated Jan. 21, 2020; (7 pages).

*Primary Examiner* — Adam M Alharbi
(74) *Attorney, Agent, or Firm* — K&L Gates LLP (57) ABSTRACT

A method of calculating a climb-dive marker (CDM) that is visibly present on a display even as the aircraft approaches a roll angle of +/−90° is provided. An exemplary CDM method comprises obtaining, an X-axis velocity, a Y-axis velocity, and a Z-axis velocity in aircraft body coordinates of an aircraft; calculating a CDM elevation; and displaying, by the controller, the calculated CDM elevation. The method can further comprise obtaining an angle of attack (AoA) of the aircraft and a roll angle of the aircraft, wherein the AoA is set as the value of the CDM elevation when the roll angle is within a preset range. The CDM elevation may also be calculated using a combination of the AOA and the CDM formula when roll angle is within a second preset range.

19 Claims, 7 Drawing Sheets

(51) Int. Cl.
*B64D 43/00* (2006.01)
*G02B 27/01* (2006.01)

(56) References Cited

U.S. PATENT DOCUMENTS

| | | | |
|---|---|---|---|
| 8,089,375 B1 | 1/2012 | Seah | |
| 10,118,696 B1* | 11/2018 | Hoffberg | B64C 39/001 |
| 2005/0149251 A1* | 7/2005 | Donath | G01C 21/26 |
| | | | 701/532 |
| 2006/0265120 A1* | 11/2006 | Coleman | G01C 21/18 |
| | | | 702/153 |
| 2015/0362332 A1 | 12/2015 | Vernaleken et al. | |

* cited by examiner

COMPUTING AND DISPLAYING CLIMB DIVE MARKER ELEVATION

CROSS-REFERENCE TO RELATED APPLICATIONS

This application is a non-provisional of U.S. Provisional Patent Application No. 62/535,809 filed Jul. 21, 2017, which is hereby incorporated in its entirety.

BACKGROUND

Figure 1A:
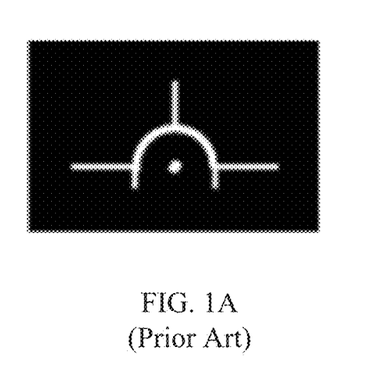
FIG. 1A illustrates a prior art CDM for use on a display.
Figure 1B:
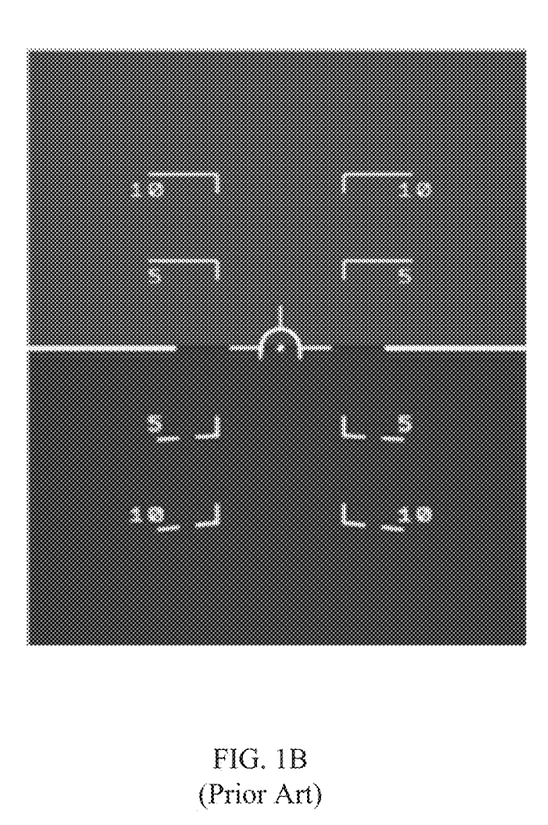
FIG. 1B illustrates a prior art display showing a climb-dive ladder with CDM at 0° angle.
Figure 2A:
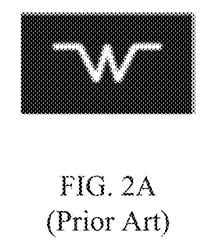
FIG. 2A illustrates a prior art aircraft reference line for use on a display.
Figure 2B:
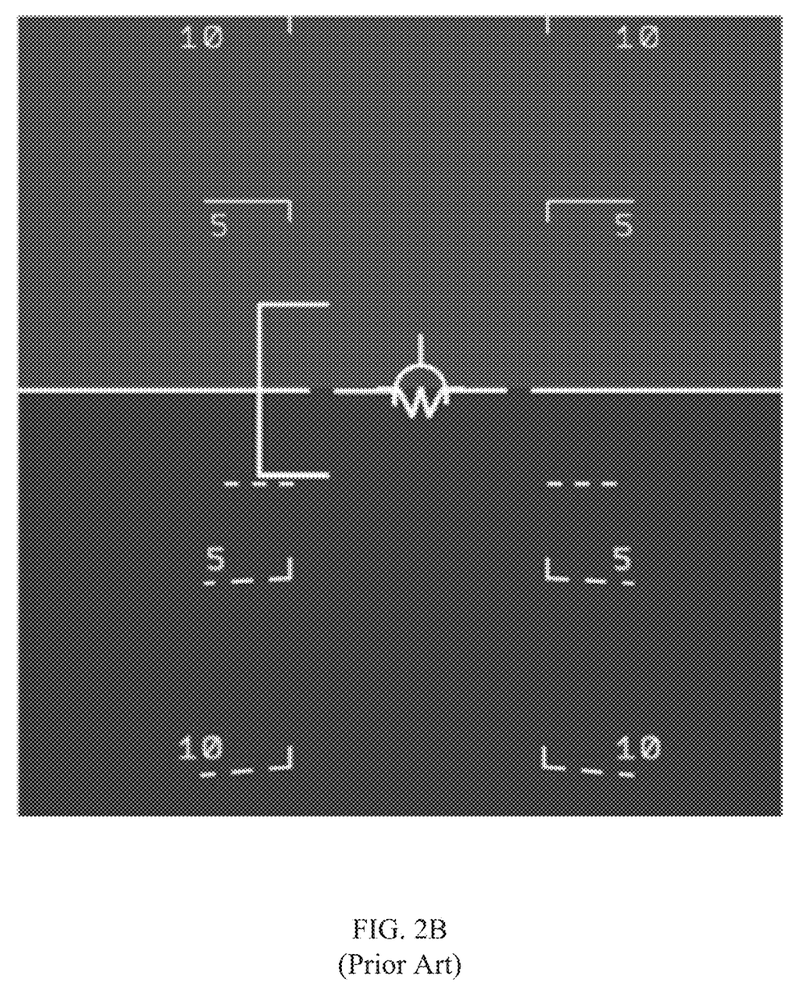
FIG. 2B illustrates a prior art display showing a climb-dive ladder with an aircraft reference line, a CDM, and an AoA bracket.
Figure 3:
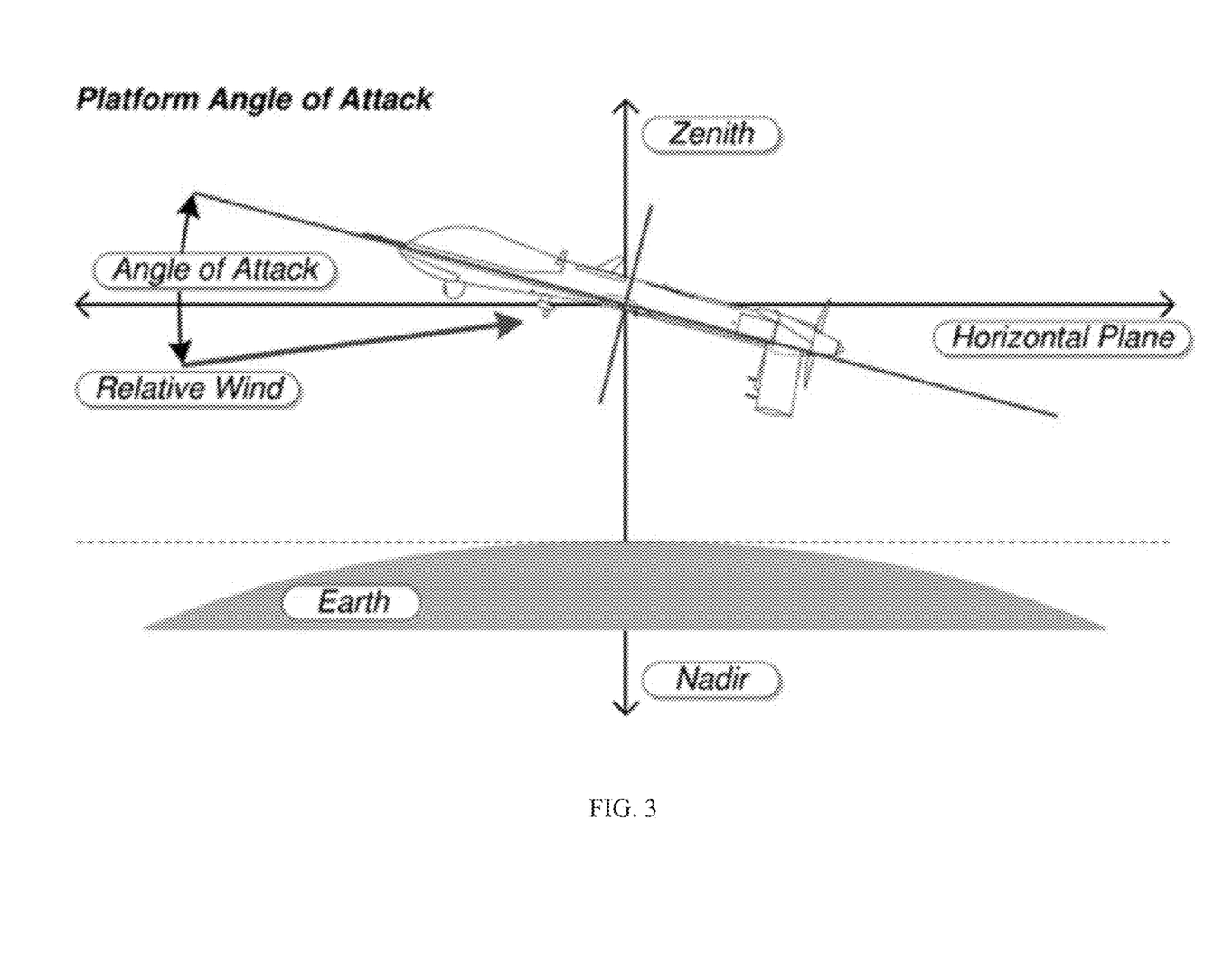
FIG. 3 illustrates a diagram for measuring AoA.

Aircraft instruments include several displays and symbology to provide different data and indications to a pilot of an aircraft. For example, FIG. 1A illustrates a climb dive marker (CDM), where the CDM displays the current climb-dive angle when read in conjunction with a climb-dive ladder. The climb-dive ladder shows an aircraft's current climb or dive angle relative to the horizon line, such as illustrated in FIG. 1B. In addition, FIG. 2A illustrates an aircraft reference line and FIG. 2B illustrates a display having a climb-dive ladder with an aircraft reference line, a CDM, and an Angle of Attack (AoA) bracket. The AoA bracket indicates the AoA, which specifies the angle between the chord line of the wing and the vector representing the relative motion between the aircraft and the atmosphere expressed in degrees, as illustrated in FIG. 3. During flight, a pitch angle of an aircraft moves the climb-dive ladder vertically in relation to the horizon line, while an aircraft roll angle moves the climb-dive ladder rotationally in reference to the aircraft reference line. The roll angle is also referred to as a bank angle, and is the angle of rotation about the aircraft's front-to-back axis. In operation, the CDM moves vertically within a display's field of view (FOV) to indicate the current climb-dive angle but is fixed horizontally in the display's FOV. Thus, when an aircraft rolls, the CDM indicates the "vertical" angle of the roll but does not indicate the "horizontal" angle. As used herein, the vertical direction is with reference to the earth, and the horizontal direction is orthogonal to the vertical direction.

However, various calculation and display issues may occur with the CDM when an aircraft's roll approaches +/−90 degrees. For example, the CDM may move to the top or bottom edge and marked as an invalid indicator (e.g., an "x" through the CDM).

SUMMARY

An exemplary method of calculating the CDM can results in a CDM value that is visibly present on a display even as the aircraft approaches a roll angle of +/−90°. An exemplary CDM method comprises obtaining, by a controller, an X-axis velocity in aircraft body coordinates, a Y-axis velocity in aircraft body coordinates, and a Z-axis velocity in aircraft body coordinates of an aircraft; calculating, by the controller, a CDM elevation using a CDM formula; and displaying, by the controller, the calculated CDM elevation. The method can further comprise obtaining an AoA of the aircraft and a roll angle of the aircraft, wherein the AoA is set as the value of the CDM elevation when the roll angle is greater than a first preset value and less than a second preset value. In various embodiments, the CDM elevation is calculated using a combination of the AOA and the CDM formula when roll angle is greater than the third preset value and less than the first preset value, or when the roll angle is greater than the second preset value and less than the fourth preset value.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are a device for providing flight condition information and a method of displaying such information in an aircraft. In accordance with various embodiments, the CDM elevation can be modified with AoA data for display to provide a more consistent display marker for a pilot. The CDM tends to be dynamic within the FOV compared to the climb-dive ladder's relation to the fixed pitch horizon line reference. Much of the dynamic quality of the CDM is due to the transient increases in AoA during variable pitch rate maneuvering resulting from the inertial lags of the velocity vector relative to the aircraft's pitch attitude.

The CDM is defined in Air Force Life Cycle Management Center—Aircraft Systems' MIL-STD-1787C, Section C.4.1. The typical equation for the CDM elevation is shown in Equation 1:

$$CDM_{el} = \tan^{-1}\left(-\frac{V_{zb}}{V_{xb}}\right) \qquad (1)$$

where $CDM_{el}$ is the CDM elevation in degrees, $V_{xb}$ is the X-axis velocity in aircraft body coordinates, and $V_{zb}$ is the Z-axis velocity in aircraft body coordinates. The typical equation supplied by MIL-STD-1787C for the CDM can have divergent (when compared to the CDM on a heads-up display (HUD)) issues during high rolls and high winds (X Velocity in the aircraft body coordinate system or Vxb).

Figure 4:
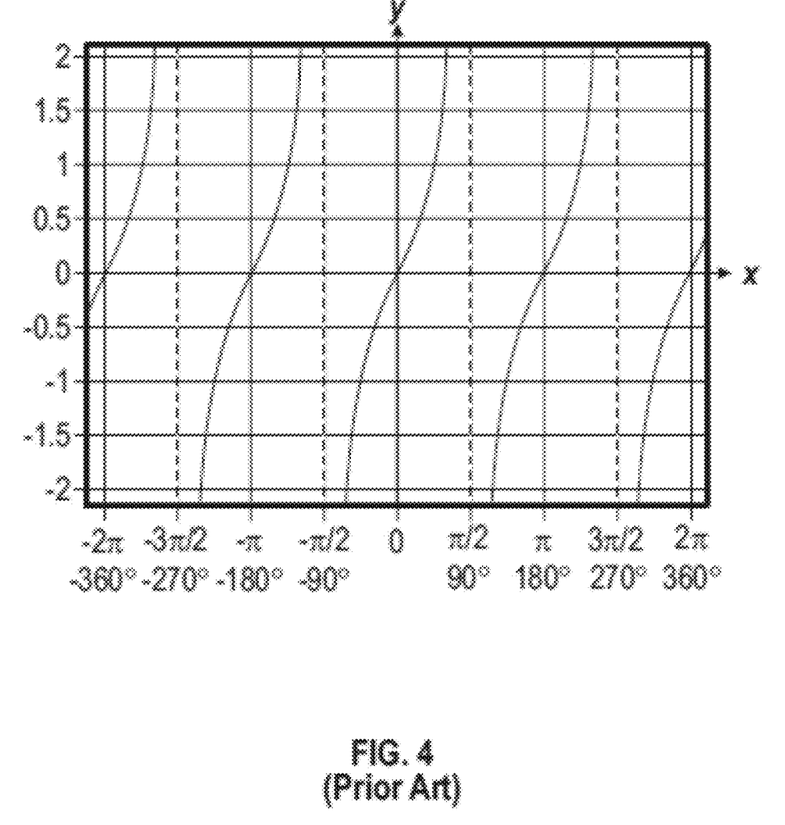
FIG. 4 illustrates a graphical representation of a prior art CDM calculation over 360 degree range.

In accordance with various embodiments, a more accurate formula for CDM elevation is shown in Equation 2:

$$CDM_{el} = \tan^{-1}\left(-\frac{V_{zb}}{V_{xb}}\right) + \tan\varphi\tan^{-1}\left(-\frac{V_{yb}}{V_{xb}}\right) \quad (2)$$

where $CDM_{el}$ is the CDM elevation in degrees, $V_{xb}$ is the X-axis velocity in aircraft body coordinates, $V_{yb}$ is the Y-axis velocity in aircraft body coordinates, $V_{zb}$ is the Z-axis velocity in aircraft body coordinates, and $\varphi$ is roll in aircraft body coordinates. However, as roll ($\varphi$) approaches −90 degrees or +90 degrees, the factor approaches infinity, as shown in FIG. 4.

Therefore, in accordance with various embodiments, the calculation and display of the CDM elevation for display on a display panel or HUD can be a blended CDM value. The blended CDM value can comprise a combination of the CDM as calculated in Equation 2 and the AoA. The blended CDM value has increased accuracy compared to Equation 1 and Equation 2 because the AoA can more closely model the CDM on the display panel when the aircraft roll approaches the range of +/−90°.

Figure 5:
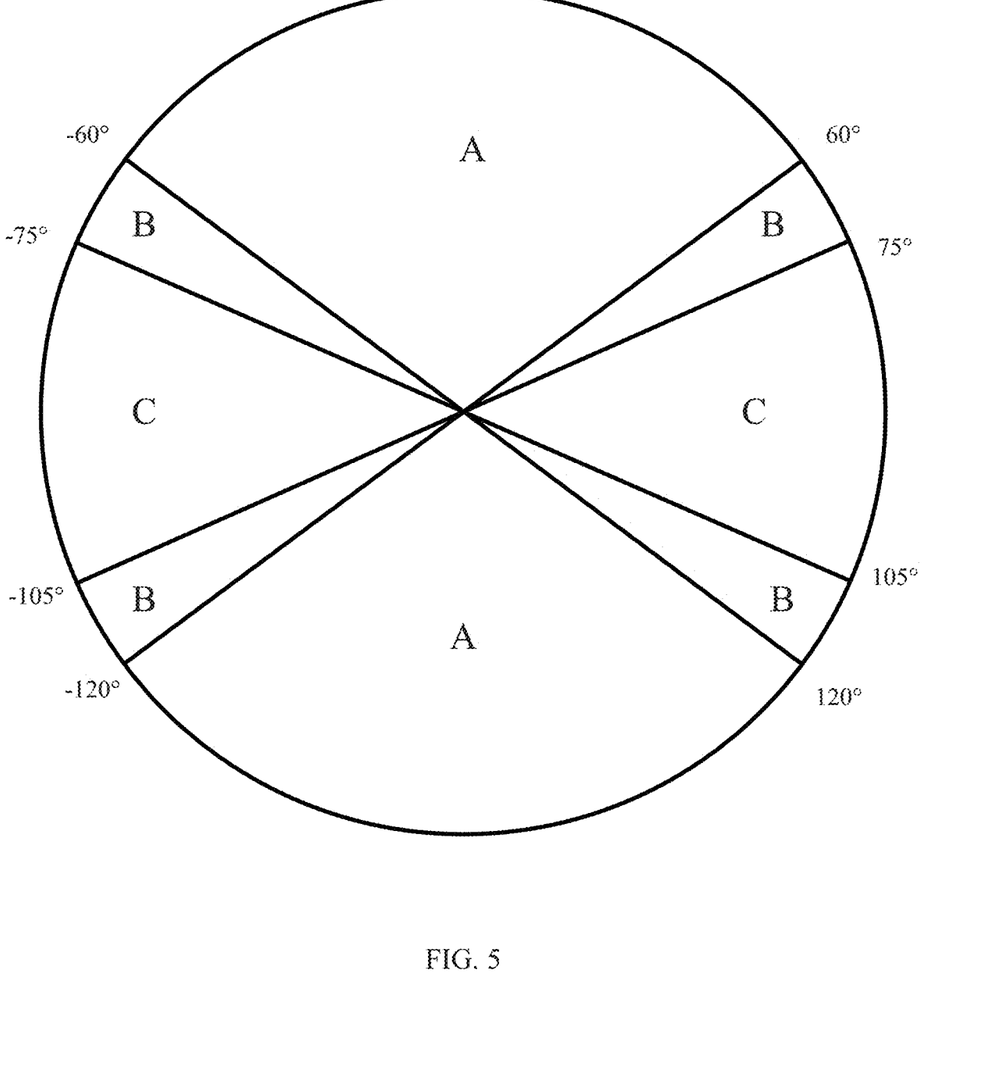
FIG. 5 illustrates a blended approach of CDM determination in accordance with various embodiments.

In accordance with various embodiments, the blended CDM value can be based upon roll regions is illustrated in FIG. 5. In the A regions, Equation 2 is used. In the C region, only the AoA is used to calculate the blended CDM value. In the B regions, a combined version of Equation 2 and the AoA is used as shown in Equation 3 below. An exemplary combined CDM value for the B region can be calculated as follows:

$$CDM_{blended} = \tfrac{1}{2}CDM_{el} + \tfrac{1}{2}AOA \quad (3)$$

where $CDM_{el}$ is the CDM elevation in degrees as calculated in Equation 2 and AOA is the angle of attack.

For example and as shown in FIG. 5, the B region may be implemented for roll regions between 60° and 75°, and in the B region the CDM elevation is calculated using ½ of the value from Equation 2 and ½ of the AoA. In various embodiments, the B region is calculated with different ratios of Equation 2 and the AoA, such as ratios within the range of 0.4 to 0.6 or any ratio combination with a combined value of "1". For example, the blended approach may calculate the blended CDM value based on 0.4 AoA+0.6 $CDM_{el}$; 0.6 AoA+0.4 $CDM_{el}$; or any other combination within the ratio range of 0.4 to 0.6. Further, in various embodiments, the roll angles for the B region may have different ranges than those shown in FIG. 5, such as 55° to 80° and 100 to 125° or ranges therein.

In accordance with various embodiments, the combined CDM value can be calculated using a shifting ratio of the AOA and CDM factors. For example, the ratio between the AOA and CDM factors can shift from 1.0/0 to 0/1.0 as the roll angle approaches the thresholds of the B region of FIG. 5. For example, at the transition from the A region to the B region, the combined CDM value can be calculated as $CDM_{blended} = 1.0*CDM_{el} + 0.0*AOA$. The ratio can then shift as the roll angle changes, such that at the transition from the B region to the C region, the combined CDM value can be calculated as $CDM_{blended} = 0.0*CDM_{el} + 1.0*AOA$. The ratio shifting can be linear, incremental, or any other manner of shifting ratios from 1.0/0 to 0/1.0 as would be understood by one skilled in the art.

The combined CDM value is projected as the CDM for display on a HUD. The benefit of using the combined CDM value as the CDM value is that the CDM is visibly present regardless of the aircraft's roll angle. As an improvement over the prior art CDM displays, the approach described herein is able to display the CDM even as the aircraft approaches a roll angle of +/−90°.

Figure 6:
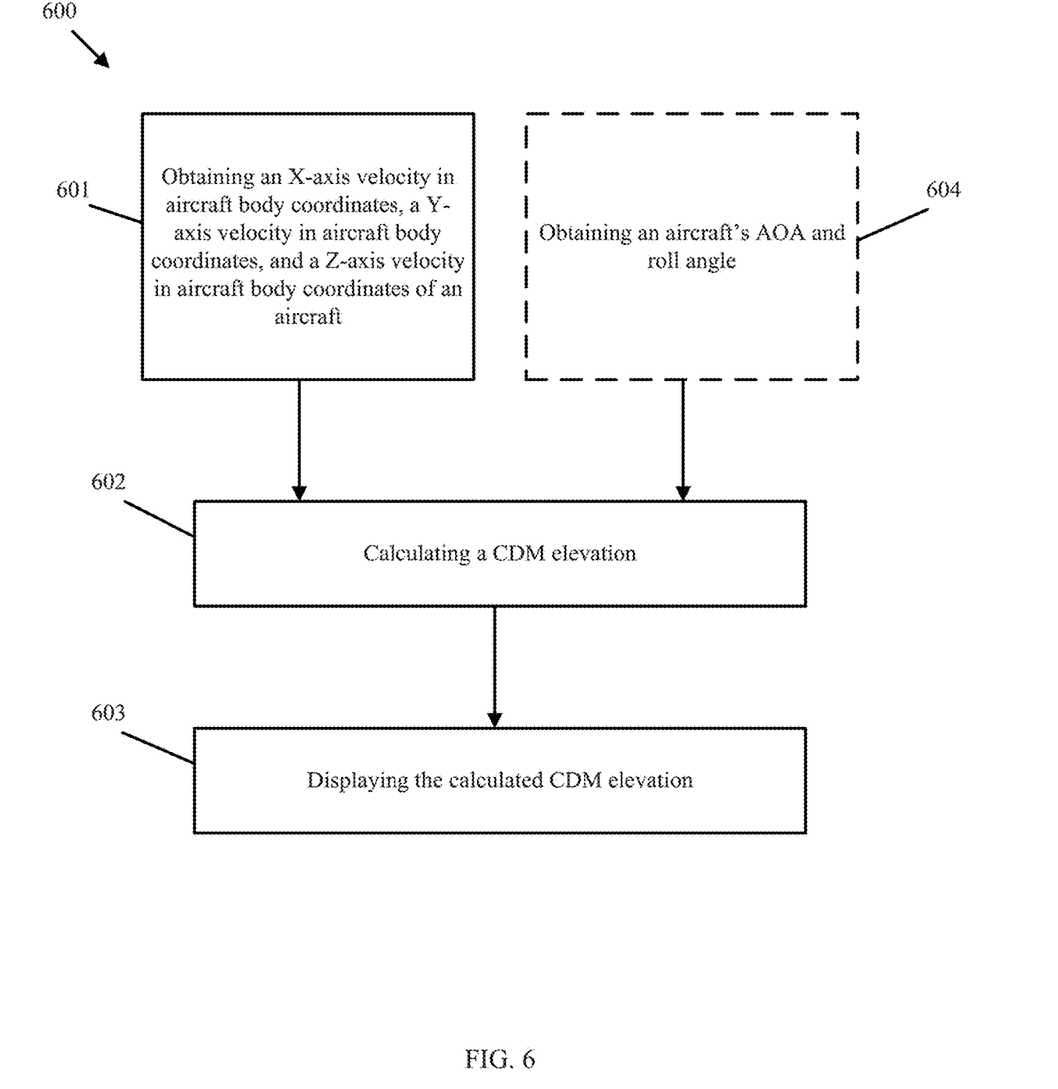
FIG. 6 is a flowchart of an exemplary a method for determining and displaying a CDM.

In accordance with various embodiments and with reference to FIG. 6, a method 600 for determining and displaying a CDM can comprise obtaining, by a controller, an X-axis velocity in aircraft body coordinates, a Y-axis velocity in aircraft body coordinates, and a Z-axis velocity in aircraft body coordinates of an aircraft 601; calculating, by the controller, a CDM elevation using Equation 2 602, and displaying, by the controller, the calculated CDM elevation 603. The method can further comprise obtaining an AoA of the aircraft and a roll angle of the aircraft 604, where the AoA is set as the value of the CDM elevation when the roll angle is greater than a first preset value and less than a second preset value. The X-axis velocity, the Y-axis velocity, and the Z-axis velocity of the aircraft can be obtained from a navigation system of the aircraft, such as an Embedded Global Positioning/Inertial Navigation System (EGI). The controller receives data as part of receiving EGI data and position information data from a data scan controller (DSC) via a 1553B interface, which is part of MIL-STD-1553B standard. The controller performs a matrix transformation on the received data to convert to aircraft coordinates.

In various embodiments, the CDM elevation is calculated using the Equation 2 formula when the roll angle is less than a third preset value or greater than a fourth preset value. Furthermore, in various embodiments, the CDM elevation is calculated using a combination of the AOA and Equation 2 when roll angle is greater than the third preset value and less than the first preset value, or when the roll angle is greater than the second preset value and less than the fourth preset value.

In accordance with various embodiments, the method comprises calculating the CDM elevation using a blended formula when the roll angle is less than a first preset value and greater than a second preset value, wherein the blended formula is: $X*CDM_{el} + Y*AoA$, wherein $0 \le X \le 1$, wherein $0 \le Y \le 1$, and wherein $X+Y=1$. In some embodiments, X approaches the value of 1 ($X \to 1$) as the roll angle approaches the first preset value, and Y approaches the value of 1 ($Y \to 1$) as the roll angle approaches the second preset value. The first preset value may be within a range of 55° to 80°, and the second preset value may be within a range of 100° to 125°, where the second preset value is greater than the first preset value.

Figure 7:
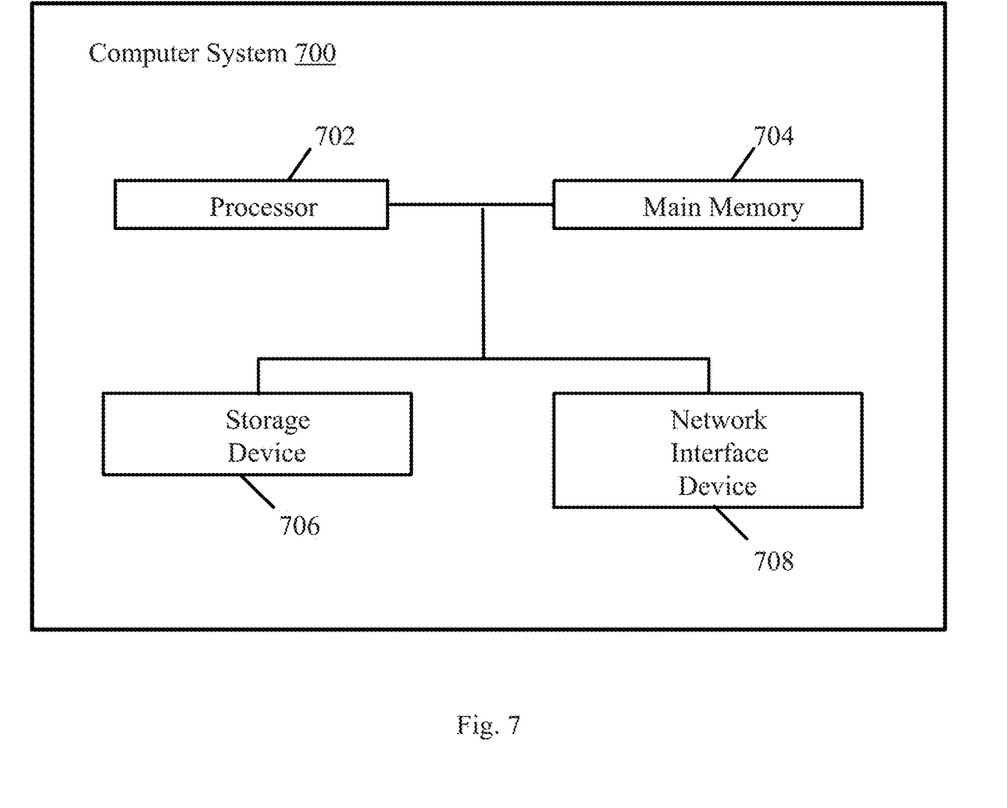
FIG. 7 illustrates a computer system in accordance with various embodiments.

FIG. 7 shows a computer system 500, which is illustrative of a computer system that may be used in connection with the various embodiments disclosed herein. The computer system 500 may be illustrative of, for example, a laptop, a desktop computer, a computer within a node of several computers, or any other computing system that may be connected to a network of computers. The computer system 500 comprises a processor 502, and a main memory 504 coupled to processor 502. Additionally, processor 502 and main memory 504 may be coupled to storage device 506, and a network interface device 508.

Programs executable by the processor 502 may be stored on the storage device 506 (e.g., a hard drive, solid state disk, memory stick, optical disc), and accessed when needed by the processor 502. Programs stored on the storage device 506 may comprise programs to implement various processes on the computer system 500. In some cases, the programs are copied from the storage device 506 to the main memory 504, and the programs are executed from the main memory 504. Thus, both the main memory 504 and storage device 506 shall be considered computer-readable storage mediums.

In various embodiments, network interface device 508 may allow computer system 500 to exchange data over a wireless or wired network. In some embodiments the computer system 500 may be connected to a plurality of other computers within a shared network. Thus, while many aspects may be performed serially, various embodiments enable parallel processing to speed up the overall processing time.

The apparatus 100 depicted in FIG. 6 may be implemented in a computer system 500. The input interfaces for the first and second altitude sources 110, 120 may be implemented as part of a bus between the processor 502 and the other components or as part of the network interface device 508. The data fusion component 150 and converter 140 may be implemented by computer code stored in main memory 504 and executed by the processor 502.

From the description provided herein, those skilled in the art are readily able to combine software with appropriate general-purpose or special-purpose computer hardware to create a computer system and/or computer subcomponents in accordance with the various embodiments and methods.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used here, "at least one of," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, C, and C together.

Persons of ordinary skill in the art may understand that all or some of the steps of the methods in the embodiments may be implemented by a program instructing relevant hardware (such as a processor). The program may be stored in a computer readable storage medium. The storage medium may include a read-only memory (ROM), a random access memory (RAM), a magnetic disk, or an optical disc.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A climb-dive marker (CDM) method, comprising:
obtaining, by a controller, an X-axis velocity in aircraft body coordinates, a Y-axis velocity in aircraft body coordinates, and a Z-axis velocity in aircraft body coordinates of an aircraft;
calculating, by the controller, a CDM elevation using a CDM formula:

$$CDM_{el} = \tan^{-1} \frac{-V_{zb}}{V_{xb}} + \tan\varphi \tan^{-1} \frac{-V_{yb}}{V_{xb}};$$

and
displaying, by the controller, the calculated CDM elevation.

2. The method of claim 1, further comprising obtaining an angle of attack (AoA) of the aircraft and a roll angle of the aircraft, wherein the AoA is set as the value of the CDM elevation when the roll angle is greater than a first preset value and less than a second preset value.

3. The method of 2, wherein the CDM elevation is calculated using the CDM formula when the roll angle is less than a third preset value or greater than a fourth preset value.

4. The method of claim 3, wherein the CDM elevation is calculated using a combination of the AOA and the CDM formula when roll angle is greater than the third preset value and less than the first preset value, or when the roll angle is greater than the second preset value and less than the fourth preset value.

5. The method of claim 1, further comprising: obtaining an AoA of the aircraft; and
calculating the CDM elevation based in part on the CDM formula and based in part on the AoA.

6. The method of claim 1, further comprising:
obtaining an AoA of the aircraft; obtaining a roll angle of the aircraft; and
calculating the CDM elevation using a blended formula when the roll angle is less than a first preset value and greater than a second preset value, wherein the blended formula is:

$X^*CDM_{el} + Y^*AoA$, wherein $0 \leq X \leq 1$, wherein $0 \leq Y \leq 1$, and wherein $X+Y=1$.

7. The method of claim 5, wherein $X \rightarrow 1$ as the roll angle approaches the first preset value, and wherein $Y \rightarrow 1$ as the roll angle approaches the second preset value.

8. The method of claim 5, wherein $X=0.5$, and wherein $Y=0.5$.

9. The method of claim 5, wherein the first preset value is within a range of 55° to 80°, and wherein the second preset value is within a range of 100° to 125°, and wherein the second preset value is greater than the first preset value.

10. The method of claim 1, wherein the X-axis velocity, the Y-axis velocity, and the Z-axis velocity of the aircraft are obtained from a navigation system of the aircraft.

11. The method of claim 1, further comprising displaying the calculated CDM elevation on a heads-up display (HUD).

12. The method of claim 1, further comprising displaying the calculated CDM elevation on a panel screen of the aircraft.

13. A device comprising:
a memory storing executable instructions; and a processor coupled to the memory and configured to:
obtain an X-axis velocity in aircraft body coordinates, a Y-axis velocity in aircraft body coordinates, and a Z-axis velocity in aircraft body coordinates of an aircraft; calculate a climb-dive market (CDM) elevation using a CDM formula:

$$CDM_e i = \tan^{-1}\frac{\ }{V_x b} + \tan < p\ \tan^{-1}\frac{\ }{Vxb}\ \text{—and}$$

transmit, to a controller, the calculated CDM elevation for display.

14. The device of claim 12, wherein the processor is further configured to obtain an angle of attack (AoA) of the aircraft and a roll angle of the aircraft, wherein the AoA is set as the value of the CDM elevation when the roll angle is greater than a first preset value and less than a second preset value.

15. The device of 13, wherein the CDM elevation is calculated using the CDM formula when the roll angle is less than a third preset value or greater than a fourth preset value.

16. The device of claim 14, wherein the CDM elevation is calculated using a combination of the AOA and the CDM formula when roll angle is greater than the third preset value and less than the first preset value, or when the roll angle is greater than the second preset value and less than the fourth preset value.

17. The device of claim 12, wherein the processor is further configured to:
    obtain an AoA of the aircraft; and
    calculate the CDM elevation based in part on the CDM formula and based in part on the AoA.

18. The device of claim 12, wherein the processor is further configured to:
    obtain an AoA of the aircraft;
    obtain a roll angle of the aircraft; and
    calculate the CDM elevation using a blended formula when the roll angle is less than a first preset value and greater than a second preset value, wherein the blended formula is:

$$X*CDM_{ef} + Y*AoA,$$

wherein $0 \leq X \leq 1$, wherein $0 \leq Y \leq 1$, and wherein $X+Y=1$.

19. The device of claim 17, wherein $X \rightarrow 1$ as the roll angle approaches the first preset value, and wherein $Y \rightarrow 1$ as the roll angle approaches the second preset value.

\* \* \* \* \*